United States Patent [19]

Sullivan et al.

[11] 4,008,308

[45] Feb. 15, 1977

[54] SEPARATION OF COBALT FROM NICKEL THIOCYANATES WITH ISOPHORONE

[75] Inventors: Patrick Bernard Sullivan, Peekskill; Glenn Franklin Mitchell, Bedford Hills, both of N.Y.

[73] Assignee: Union Carbide Corporation, New York, N.Y.

[22] Filed: Dec. 18, 1975

[21] Appl. No.: 642,306

[52] U.S. Cl. ............................................. 423/139
[51] Int. Cl.² ...................................... C01G 51/00
[58] Field of Search ................................... 423/139

[56] References Cited

UNITED STATES PATENTS

| 2,902,345 | 9/1959 | Hyde et al. | 423/139 |
| 3,069,231 | 12/1962 | Hard et al. | 423/139 |

OTHER PUBLICATIONS

Brubaker et al. *J. Inorg. Nucl. Chem.* (1959) vol. 9, pp. 184–187.
Sharp et al. *Journal American Chemical Society* vol. 77 pp. 6519–6521 (1955).

*Primary Examiner*—Oscar R. Vertiz
*Assistant Examiner*—Brian E. Hearn
*Attorney, Agent, or Firm*—Bernard Francis Crowe

[57] ABSTRACT

The separation of cobalt from nickel is enhanced by extracting aqueous solutions of the respective thiocyanates with a cyclic ketone, preferably isophorone.

4 Claims, No Drawings

SEPARATION OF COBALT FROM NICKEL THIOCYANATES WITH ISOPHORONE

BACKGROUND OF THE INVENTION

This invention pertains to the separation of cobalt from nickel and in particular to a liquid-liquid extraction procedure in which cobalt thiocyanate is extracted into an organic phase and nickel thiocyanate remains in an aqueous phase.

Cobalt and nickel are similar in their chemical and physical properties as would be expected from their relative positions in the periodic table of the elements. It is therefore difficult to effect a practical separation of these two metals which are found together in nature. Their ores have been treated in numerous ways to effect a separation of nickel from cobalt. One such technique involves the conversion of these metals to their respective thiocyanates in an aqueous solution and the extraction therefrom of cobalt thiocyanate by treatment with a water-immiscible organic solvent leaving the nickel thiocyanate in aqueous solution. In one commercial operation nickel and cobalt ores are converted to the corresponding sulfates or carbonates which in turn are treated with thiocyanic acid dissolved in methyl isobutyl ketone (hexone). Alcohols, ketones, and ethers have been broadly disclosed for use as the organic water-immiscible solvent in liquid-liquid extraction processes for separating cobalt from nickel. However all of these disclosures suffer from a drawback, namely, the extraction of the cobalt into the organic phase is not as efficient or clear cut as desired.

SUMMARY OF THE INVENTION

An improvement in the process for the separation of nickel from cobalt thiocyanates by extracting an aqueous solution thereof with a water-immiscible organic solvent whereby cobalt thiocyanate is selectively extracted into the organic phase leaving the nickel thiocyanate in the aqueous phase, comprises using a cyclic ketone having about 5 to about 20 carbon atoms as the water-immiscible organic solvent.

The preferred cyclic ketone for use in this invention is isophorone, an inexpensive, commercially available material. Other cyclic ketones which can be used include: 2,4,4-trimethylcyclopentanone, 2,4,4-trimethylcyclopentenone, 3,5,5-trimethylcyclopentenone, and the like.

Temperature and pressure are not critical and so ambient temperatures are preferred for economic reasons as well as atmospheric pressures although it is understood that superatmospheric as well as subatmospheric pressures can be used if desired.

It has been found convenient to convert the cobalt and nickel ores into their respective sulfates by treatment with sulfuric acid or chlorides by treatment with hydrochloric acid and then treating the aqueous inorganic salts in aqueous solution with ammonium thiocyanate to provide the cobalt and nickel in the form of their thiocyanates. It was unexpectedly found that the sharpness of separation of cobalt from nickel isocyanate could be improved by using an aqueous solution containing ammonium thiocyanate at a concentration of at least 35 grams of ammonium thiocyanate per liter of solution.

The selectivity and high co-loading capacity of these cyclic ketones was also unexpected.

For the recovery of the cobalt from the cyclic ketone phase completeness of separation is effected by contacting said organic phase with an aqueous inorganic acid solution having a molarity of at least about 5. The preferred inorganic acids both for efficiency and economy are sulfuric acid and hydrochloric acid.

Conventional equipment and processing can be used for recovery of the nickel from the aqueous solution and the cobalt from the organic phase. As to the latter, treatment of the organic phase with 5 molar aqueous sulfuric acid or hydrochloric acid affords the corresponding cobalt sulfate or cobalt chloride solutions. These salts can be reduced to the respective metals by any of the conventional processes such as hydrogen reduction, electrolysis, precipitation to oxide followed by reduction and the like. They can also be electroplated out of solution if desired.

The invention is further described in the examples which follow. All parts and percentages are by weight unless otherwise specified.

EXAMPLE 1

In order to simulate a commercial separation of nickel from cobalt a solution was prepared containing 268.43 grams of $NiSO_4.6H_2O$, 4.77 grams of $CoSO_4.7H_2O$, and 50.00 grams of ammonium thiocyanate all diluted to one liter of solution with distilled water.

A 60 ml. separatory funnel was charged with 10 ml. of isophorone and 10 ml. of the salt solution prepared above. The funnel was shaken for 20 minutes and then held statically in a ring stand to allow separation into an upper organic phase and a lower aqueous phase. The equilibrium pH of the aqueous phase was 2.6. Analysis of the aqueous raffinate by atomic absorption spectroscopy (AAS) using a Varian Model 1000 indicated that 100 percent of the cobalt from the standard solution prepared above was extracted into the organic phase and 0 percent of the nickel was extracted. The percent extraction was determined as follows:

$$\% \text{ Metal Extracted} = \frac{\text{original aqueous metal concentration} - \text{raffinate metal concentration}}{\text{original aqueous metal concentration}} \times 100$$

CONTROL A

Example 1 was repeated with the exception that 10 ml. of methyl isobutyl ketone was substituted for the 10 ml. of isophorone. Again two phases were obtained but the aqueous raffinate when examined by AAS indicated that 0 percent cobalt and 0 percent nickel were extracted into it. The equilibrium pH in this system was 2.5.

EXAMPLES 2 – 4

The effect of pH on the extraction of cobalt and nickel was studied at 3 equilibrium pHs. Three 10 ml. aliquot portions of stock solution of nickel sulfate, cobalt sulfate, and ammonium thiocyanate prepared in Example 1 were each placed in a 60 ml. separatory funnel together with 20 drops of a 2.04 molar aqueous sulfuric acid solution in the first funnel, 10 drops of water and 10 drops of a 2.04 molar aqueous sulfuric acid solution in the second funnel, and 15 drops of water plus 5 drops of 2.04 molar aqueous sulfuric acid solution in the third funnel. Then 10 ml. of isophorone was added to each in the funnels which was shaken for 20 minutes and then allowed to stand until two phases separated. The equilibrium pH of the three respective solutions was 1.6, 1.9, 2.1. In each case 100 percent of the cobalt and 0 percent of the nickel was extracted into the isophorone layer as determined by AAS analysis.

CONTROLS B, C AND D

Repeating examples 2–4 with the exception that methyl isobutyl ketone was substituted for the isophorone three mixtures were obtained having equilibrium pH's of 1.5, 1.7 and 2.0 respectively. In each case 0 percent nickel and 0 percent cobalt were extracted into the methyl isobutyl ketone layer.

EXAMPLES 5 – 8

The effect of concentration of the cobalt extracted from the aqueous phase was determined by charging four 60 ml. separatory funnels as follows: 5 ml. of isophorone and 5 ml. of the stock solution from Example 1 in the first; 5 ml. of isophorone and 25 ml. of stock solution in the second; 2 ml. of isophorone and 20 ml. of stock solution in the third and 1 ml. of isophorone and 25 ml. of stock solution in the fourth.

The separatory funnels were shaken for 20 minutes and allowed to stand. The distribution of cobalt in grams per liter between the organic phase/aqueous phase was as follows:
Funnel 1 - 1.05/0
Funnel 2 - 2.38/0.58
Funnel 3 - 3.0/0.75
Funnel 4 - 3.13/0.93

CONTROLS E – H

When Examples 5–8 were repeated with the exception that methyl isobutyl ketone was substituted for the isophorone, the four funnels showed no extraction of cobalt into the organic layer.

EXAMPLE 9

The effect of ammonium thiocyanate concentration on the extraction of cobalt was studied by preparing an aqueous solution containing 70 grams of ammonium thiocyanate per liter and a solution of cobalt sulfate ($CoSO_4 \cdot 7H_2O$) containing 12.72 grams per liter of cobalt sulfate. Ten 60 ml. separatory funnels were charged in order with 20 ml. of isophorone and 10 ml. of the cobalt sulfate solution so that 1.3 grams per liter of cobalt ion were present in each funnel. The funnels were charged with diminishing amounts of water ranging from 10 to 0 ml. and increasing amounts of ammonium thiocyanate solution ranging from 0 to 10 ml. The amounts of cobalt extracted are shown in the Table 1 below.

TABLE 1

| | % Co Extracted from Aqueous Solution | |
|---|---|---|
| $NH_4SCN$ g./liter | Into Isophorone | Into Methyl Isobutyl Ketone |
| 0 | 4 | 21 |
| 7 | 12 | 2 |
| 14 | 50 | 0 |
| 21 | 77 | 31 |
| 28 | 92 | 19 |
| 35 | 100 | 8 |
| 42 | 100 | 35 |
| 49 | 100 | 35 |
| 56 | 100 | 27 |
| 70 | 100 | 40 |

A control I was run in the same manner as Example 9 with the exception that methyl isobutyl ketone was substituted for the isophorone. The percent cobalt extracted with varying amounts of ammonium thiocyanate is also presented in Table 1.

EXAMPLE 10

The effect of various concentrations of inorganic acid on the stripping of isophorone solutions of cobalt was demonstrated by preparing ten 60 ml. separatory funnels each containing 20 ml. of isophorone, 6 ml. of aqueous ammonium thiocyanate containing 70 grams of ammonium thiocyanate per liter of solution, 4 ml. of water and 10 ml. of the cobalt sulfate solution prepared in Example 9. The separatory funnels were shaken for 20 minutes and then allowed to stand until two distinct phases separated. The aqueous phase was discarded in each case and the isophorone phase was treated in five instances with aqueous sulfuric acid ranging in molarity from 0.2 molar to 5 molar and in five instances with aqueous hydrochloric acid having the same molarities. The results delineated in Table 2 show that the efficiency of stripping cobalt from the organic phase is enhanced at the high molar concentrations of acid in both cases of sulfuric acid and hydrochloric acid.

TABLE 2

| SULFURIC ACID CONC. | HYDROCHLORIC ACID CONC. | % COBALT STRIPPED FROM ISOPHORONE LAYER |
|---|---|---|
| 0.2 M | | 0 |
| 0.5 M | | 6 |
| 1 M | | 20 |
| 2 M | | 54 |
| 5 M | | 100 |
| | 0.2 M | 0 |
| | 0.5 M | 0 |
| | 1 M | 17 |
| | 2 M | 57 |
| | 5 M | 95 |

As in the previous examples the percent cobalt was determined analytically by the atomic absorption spectra procedure. The precent cobalt stripped was determined as follows:

$$\% \text{ Co Stripped} = \frac{\left(\begin{array}{c}\text{organic phase Co}\\\text{concentration}\end{array}\right) - \left(\begin{array}{c}\text{Co concentration in aqueous}\\\text{stripping solution}\end{array}\right)}{\text{organic phase Co concentration}} \times 100$$

EXAMPLE 11

The specificity of isophorone for extracting a maximum amount of cobalt and a minimum amount of nickel from solutions of salts thereof was demonstrated with several ketones by adding 0.5 grams of ammonium thiocyanate to 10 ml. of the organic solvent to be tested in a 60 ml. separatory funnel. After shaking for 10 minutes, 10 ml. of two molar sulfuric acid was added and shaking continued for an additional 10 minutes after which the separatory funnel was allowed to stand until two phases separated. The aqueous phase was then discarded. A solution of 223.69 grams of $NiSO_4.6H_2O$ and 4.77 grams of $CoSO_4.7H_2O$ diluted to 1 liter was also prepared. Ten ml. of this cobalt plus nickel solution was added to each separatory funnel and shaken for 20 minutes then allowed to stand until separate phases appeared. The amount of nickel and cobalt in the aqueous raffinate was then determined by AAS analysis. The results obtained with various ketones compared with isophorone is contained in Table 3.

TABLE 3

| Ketone Extractant | % Co Extracted | % Ni Extracted |
|---|---|---|
| Isophorone | 100 | 0 |
| Methyl isobutyl ketone | 13 | 3 |
| Diisobutyl ketone | 0 | 3 |
| Isopropyl N-propyl ketone | 1 | 3 |
| Methyl isoamyl ketone | 5 | 3 |
| Methyl propyl ketone | 76 | 3 |
| Mesityl oxide | 1 | 3 |
| Methyl amyl ketone | 1 | 31 |
| Ethyl butyl ketone | 1 | 24 |
| Cyclohexanone | 99 | 14 |
| Acetophenone | 23 | 10 |
| Methyl butyl ketone | 27 | 3 |

Although the invention has been described in its preferred form with a certain degree of particularity, it is understood that the present disclosure of the preferred forms has been made only by way of example and that numerous changes can be resorted to without departing from the spirit and scope of the invention.

What is claimed is:
1. In the process for the separation of nickel and cobalt thiocyanate by extracting an aqueous solution thereof having a pH 1.6 to 2.6 with a water immiscible organic solvent whereby thiocyanate is selectively extracted into the organic phase leaving nickel thiocyanate in an aqueous phase, the improvement which comprises using isophorone as the water immiscible organic solvent and the aqueous solution of said nickel and cobalt thiocyanates contains ammonium thiocyanate at a concentration of at least 35 grams per liter of solution.
2. Process claimed in claim 1 where cobalt is recovered from the cyclic ketone organic phase by contacting said organic phase with an aqueous inorganic acid solution having a molarity of at least about five.
3. Process claimed in claim 2 wherein the inorganic acid is sulfuric acid.
4. Process claimed in claim 2 wherein the inorganic acid is hydrochloric acid.